US012521728B1

(12) United States Patent
Fincher et al.

(10) Patent No.: US 12,521,728 B1
(45) Date of Patent: Jan. 13, 2026

(54) CONVEYOR DRUM CHIPPER WITH SCREEN

(71) Applicant: James R. Fincher Timber Co., Inc., Wilmer, AL (US)

(72) Inventors: Richard Rainwaters Fincher, Lucedale, MS (US); Marshall Ennis Rainwaters, Mobile, AL (US); Alex Clark Paulsen, Wilmer, AL (US)

( * ) Notice: Subject to any disclaimer, the term of this patent is extended or adjusted under 35 U.S.C. 154(b) by 180 days.

(21) Appl. No.: 18/202,780

(22) Filed: May 26, 2023

(51) Int. Cl.
*B02C 23/16* (2006.01)
*B02C 18/14* (2006.01)
*B02C 18/22* (2006.01)

(52) U.S. Cl.
CPC ............ *B02C 23/16* (2013.01); *B02C 18/145* (2013.01); *B02C 18/2216* (2013.01); *B02C 2023/165* (2013.01)

(58) Field of Classification Search
CPC .................. B02C 23/08; B02C 13/286; B02C 2013/28609; B02C 2013/28636; B02C 21/02; B02C 18/145; B02C 18/225
See application file for complete search history.

(56) References Cited

U.S. PATENT DOCUMENTS 3,861,602 A 1/1975 Smith
4,009,837 A 3/1977 Schnyder
4,057,192 A 11/1977 Smith
4,135,563 A 1/1979 Maucher
4,449,673 A 5/1984 Cameron
4,544,105 A 10/1985 Carlsson
4,697,626 A 10/1987 Arasmith
4,795,103 A 1/1989 Lech
4,958,775 A 9/1990 Arasmith
4,997,135 A 3/1991 Zehr
5,005,620 A 4/1991 Morey
5,054,703 A 10/1991 Morey
5,088,532 A 2/1992 Eggers et al.
5,209,278 A 5/1993 Carpenter et al.
5,390,862 A 2/1995 Eglin
5,419,502 A 5/1995 Morey
5,669,428 A 9/1997 Hoover
5,692,548 A 12/1997 Bouwers et al.
5,720,440 A 2/1998 Bonner et al.
5,803,142 A 9/1998 Mulligan et al.
(Continued)

FOREIGN PATENT DOCUMENTS

CA 1150552 A 7/1983
CN 216000852 U 3/2022
(Continued)

*Primary Examiner* — Bobby Yeonjin Kim
(74) *Attorney, Agent, or Firm* — AdamsIP, LLC

(57) ABSTRACT

A wood chipper and a method of using the wood chipper are provided. The wood chipper has a rotating chipping drum with blades for reducing the size of wood fed to the chipping drum. The chipper also includes a sizing screen positioned below the chipping drum and a discharge conveyor positioned below the sizing screen. The discharge conveyor mechanically conveys wood chips from the chipping drum to a discharge point. The chipping drum has multiple pockets positioned around the exterior of the drum, and one of the blades is mounted adjacent to each one of the pockets. The pockets and blades are arranged in a configuration that consistently produces wood chips that are uniformly sized.

15 Claims, 8 Drawing Sheets

(56) References Cited

U.S. PATENT DOCUMENTS

| | | | |
|---|---|---|---|
| 5,803,380 A | 9/1998 | Brand et al. | |
| 5,881,959 A | 3/1999 | Hadjinian et al. | |
| 5,904,306 A | 5/1999 | Elliott et al. | |
| 5,911,372 A | 6/1999 | Williams, Jr. | |
| 5,947,395 A | 9/1999 | Peterson et al. | |
| 6,032,707 A | 3/2000 | Morey et al. | |
| 6,036,125 A | 3/2000 | Morey et al. | |
| 6,138,932 A | 10/2000 | Moore | |
| 6,290,155 B1 | 9/2001 | Thompson et al. | |
| 6,357,684 B1 | 3/2002 | Morey | |
| 6,722,596 B1 | 4/2004 | Morey | |
| 6,729,567 B1 | 5/2004 | Morey | |
| 6,814,320 B1 | 11/2004 | Morey et al. | |
| 6,840,471 B2 | 1/2005 | Roozeboom et al. | |
| 6,910,647 B2 | 6/2005 | Alford et al. | |
| 6,953,167 B2 | 10/2005 | Strong | |
| 7,011,258 B2 | 3/2006 | O'Halloran et al. | |
| 7,055,770 B2 | 6/2006 | Bardos | |
| 7,090,157 B2 | 8/2006 | Peterson et al. | |
| 7,204,442 B2 | 4/2007 | Roozeboom et al. | |
| 7,293,729 B2 | 11/2007 | Ragnarsson | |
| 7,438,097 B2 | 10/2008 | Davis | |
| 7,513,449 B2 | 4/2009 | Gross et al. | |
| 7,552,884 B2 | 6/2009 | Gross et al. | |
| 7,624,490 B2 | 12/2009 | Bardos | |
| 7,832,670 B2 | 11/2010 | Peterson et al. | |
| 7,959,097 B2 | 6/2011 | De Boef | |
| 7,971,818 B2 | 7/2011 | Smidt et al. | |
| 8,061,640 B2 | 11/2011 | Cotter et al. | |
| 8,113,453 B2 | 2/2012 | Bardos | |
| 8,245,961 B2 | 8/2012 | Vroom et al. | |
| 8,307,866 B2 | 11/2012 | Leonard | |
| 8,317,117 B2 | 11/2012 | Galloway et al. | |
| 8,567,706 B2 | 10/2013 | Bradley et al. | |
| 8,602,333 B2 | 12/2013 | Bradley et al. | |
| 8,783,593 B2 * | 7/2014 | Peterson | B02C 18/2216 241/242 |
| 8,820,667 B2 | 9/2014 | Heinrichsmeier et al. | |
| 9,021,679 B2 * | 5/2015 | Roozeboom | B02C 13/2804 241/189.1 |
| 9,038,933 B2 | 5/2015 | Fredsall | |
| 9,073,058 B2 | 7/2015 | Voelker et al. | |
| 9,248,453 B2 | 2/2016 | Pfoltner et al. | |
| 9,308,533 B2 | 4/2016 | Gross | |
| 9,370,776 B2 | 6/2016 | Roozeboom et al. | |
| 9,375,723 B2 * | 6/2016 | Breja | B02C 18/186 |
| 9,393,568 B2 | 7/2016 | Finney | |
| 9,585,314 B2 | 3/2017 | Sulman | |
| 9,656,269 B2 | 5/2017 | Kennedy et al. | |
| 9,981,405 B2 | 5/2018 | Kennedy | |
| 10,335,796 B2 | 7/2019 | Harthoorn et al. | |
| 10,350,608 B2 | 7/2019 | Helland | |
| 10,507,469 B2 | 12/2019 | Schie | |
| 10,543,616 B2 | 1/2020 | Harness et al. | |
| 10,682,649 B2 | 6/2020 | Morrow et al. | |
| 10,758,915 B2 * | 9/2020 | Davis | B02C 18/18 |
| 11,071,986 B2 | 7/2021 | Green et al. | |
| 11,241,696 B2 * | 2/2022 | Kimbell | B02C 21/02 |
| 11,338,298 B2 * | 5/2022 | Verzilli | B02C 18/145 |
| 2003/0085310 A1 | 5/2003 | Galanty et al. | |
| 2006/0043226 A1 | 3/2006 | Roozeboom et al. | |
| 2013/0200188 A1 | 8/2013 | Harthoorn et al. | |
| 2014/0175201 A1 | 6/2014 | Peterson et al. | |
| 2018/0206408 A1 | 7/2018 | Stein et al. | |
| 2020/0114367 A1 | 4/2020 | Schie | |
| 2021/0162424 A1 | 6/2021 | Anderson | |
| 2022/0097075 A1 | 3/2022 | Smith | |

FOREIGN PATENT DOCUMENTS

| | | |
|---|---|---|
| DE | 19520982 B9 | 10/2005 |
| EP | 1961485 A2 | 11/2010 |
| EP | 2818248 A1 | 12/2014 |
| WO | 2012096560 A1 | 7/2012 |
| WO | 2014055724 A1 | 4/2014 |
| WO | 2016130055 A1 | 8/2016 |

* cited by examiner

CONVEYOR DRUM CHIPPER WITH SCREEN

FIELD OF THE INVENTION

The present disclosure relates generally to a wood chipper having a chipping drum with a sizing screen and a wood chip discharge conveyor. The present wood chipper includes features that result in more uniformly sized wood chips and reduced airborne particulates.

BACKGROUND

Wood chippers may be used to mechanically reduce the size of woody material varying in size from large logs and tree trunks to small tree limbs or branches. For instance, wood chippers are commonly used on-site at mills for chipping logs or at remote sites for land clearing operations to comminute felled trees into wood chips that may be hauled offsite more easily and efficiently. In such applications, large portable horizontal wood chippers that can be towed to a site are often utilized. Such large chippers are capable of receiving large material such as logs or trees including tree trunks and forcing the material into contact with a rotating chipping drum. The woody material is continuously contacted by knives or blades mounted on the rotating drum to comminute the material to produce wood chips. Large micro chippers typically have a blower that blows the wood chips either onto the ground or directly into a trailer to be hauled away. However, the use of blowers generally creates a substantial amount of airborne particulate matter, which is undesirable, particularly when chipping wood at a location such as inside of a pulp mill. In addition, the use of a blower for conveying the chips generally requires the use of a closed-top chip trailer instead of an open top trailer if the chips are not discharged onto the ground.

Before being discharged from the wood chipper, the wood chips may pass through a sizing screen that at least partially surrounds the chipping drum, in which case the chips must be reduced to at least a certain maximum size in order to pass through the sizing screen so that the chips may be discharged through the screen. While a sizing screen ensures that individual chips do not exceed a maximum chip size corresponding to the size of apertures in the sizing screen, it does not necessarily ensure a uniform chip size, which depends not only on the particular characteristics of the woody material being comminuted (e.g., logs, stumps, branches, etc.) but also on the characteristics of the wood chipper, such as the dimensions, sizing, and spacing of the blades mounted on the chipping drum. Chips having a more uniform particle size are desirable for certain uses, such as in the paper and pellet industries, in which the wood chip size distribution may affect the overall yield and product quality. Producing chips having a more uniform size distribution may also help to reduce the quantity of pin chips and fines, which may help to maximize the overall yield of quality chips and thus minimize losses.

Accordingly, there exists a need in the art for a wood chipper that is capable of producing chips having a more uniform size distribution while minimizing losses and airborne particulate matter.

SUMMARY

In one aspect, a wood chipper and a method of using the wood chipper are provided. The wood chipper comprises a rotating chipping drum having a plurality of cutting blades mounted on the drum and a sizing screen that at least partially surrounds the drum for sizing wood chips discharged by the chipping drum. The chipper includes an infeed conveyor configured to feed wood to the chipping drum and a discharge conveyor configured to mechanically convey wood chips from the chipping drum at a location below the sizing screen to a discharge point. The drum rotates in a rotational direction such that a leading edge of each of the blades mounted on the drum moves in a downward direction toward the infeed conveyor so that the blade edges strike the wood in a downward motion against an anvil positioned at the inlet of an enclosure housing the drum.

The chipping drum has a plurality of pockets, and each of the blades is mounted on the chipping drum in a position such that the leading edge of each of the blades is disposed over a respective one of the pockets. In a preferred embodiment, the pockets are arranged in a plurality of adjacent rows of pockets, and each row of pockets includes multiple pockets that are linearly aligned with each other along a linear direction that is perpendicular to the rotational direction of the chipping drum. The pockets in each of the rows of pockets are disposed in a spaced relation to adjacent pockets in the same row, and the pockets in each row of pockets are offset from the pockets in each adjacent row of pockets. In a preferred embodiment, each of the pockets has a pair of plates disposed within the pocket. Each of the plates is disposed in a position that is perpendicular to the leading edge of the blade and parallel to the rotational direction of the chipping drum. This configuration of the chipping drum, including the arrangement of pockets and blades, aids in producing uniformly sized chips. In addition, the use of a mechanical conveyor rather than a blower generally eliminates many wear parts of the chipper, thereby reducing maintenance costs and allowing more available power to be utilized for size reduction rather than for conveying chips. A mechanical conveyor also allows the chips to be discharged into a standard open-top trailer or directly onto a mill feed conveyor when utilizing the chipper in a pulp mill.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
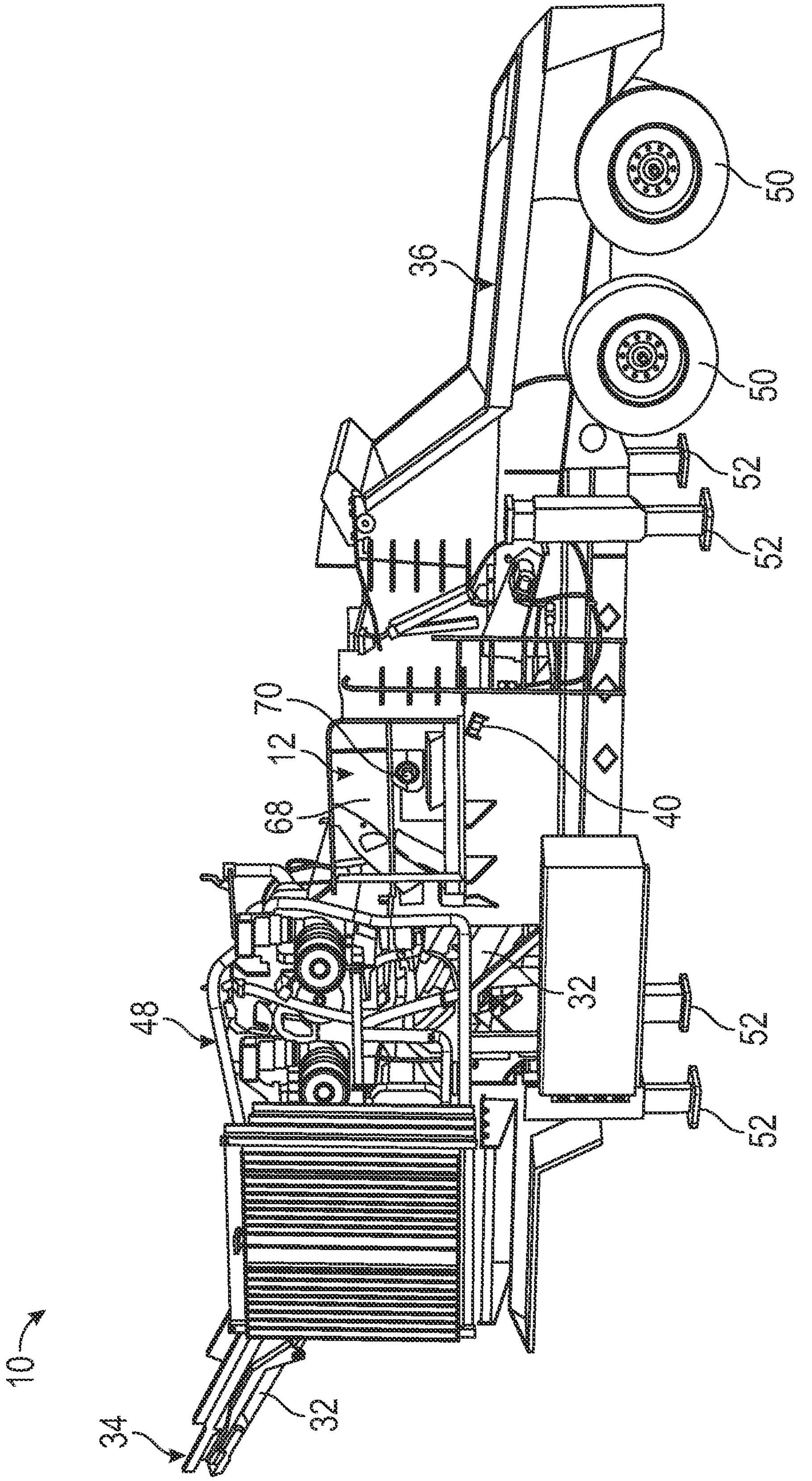
FIG. 1 shows a perspective view of a wood chipper in accordance with the present disclosure.
Figure 2:
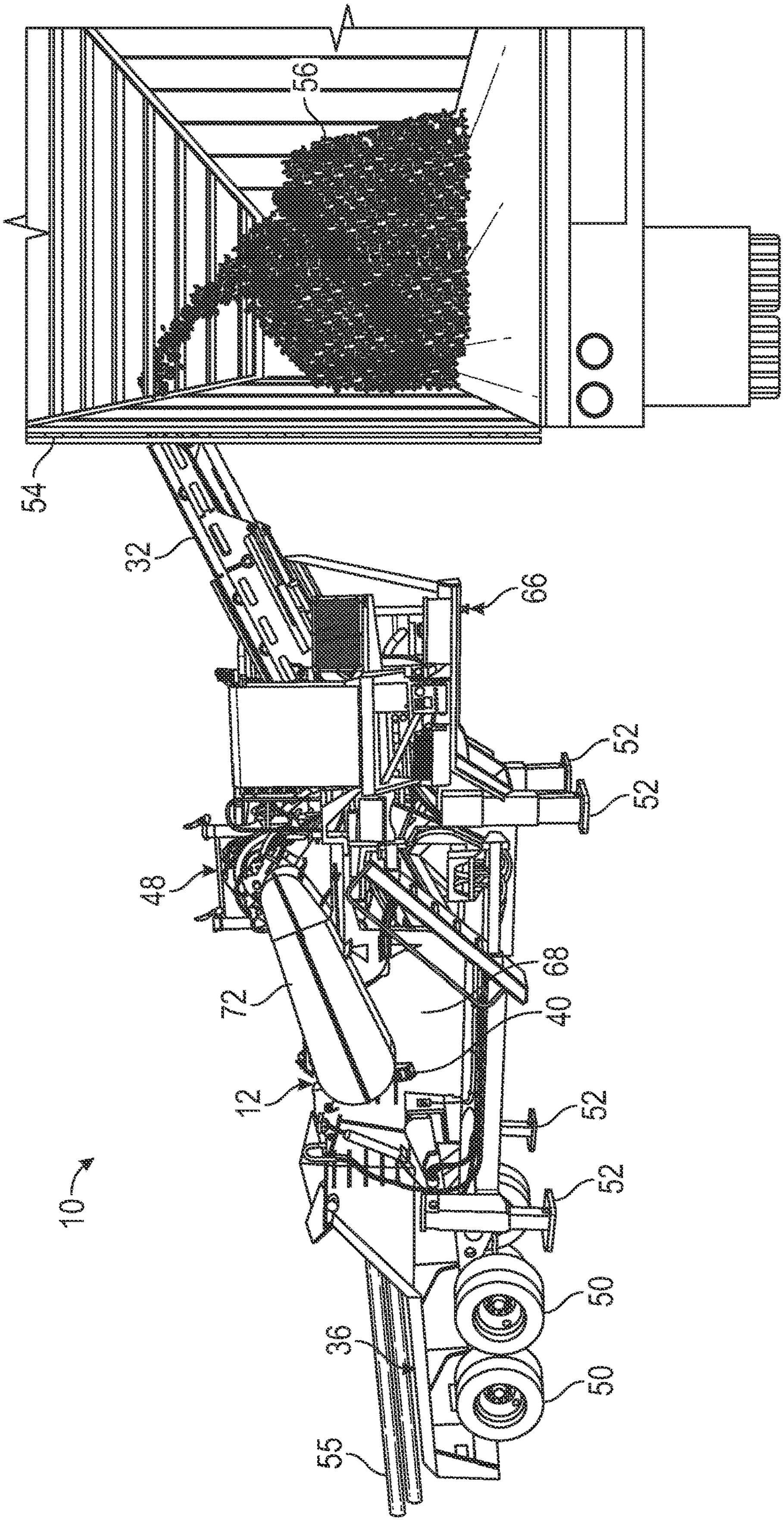
FIG. 2 shows a perspective view of a wood chipper in accordance with the present disclosure.

In one aspect, a wood chipper 10 and a method of using the chipper 10 to produce wood chips 56 are provided. FIGS. 1-11 illustrate a preferred embodiment of the chipper 10 or components thereof. As best seen in FIGS. 1 and 2, the wood chipper 10 has wheels 50 and a hitch 66 so that the chipper 10 can be towed by a tow vehicle to any suitable site for wood size reduction operations. The chipper 10 also has support struts 52 that can be raised when the chipper 10 is being towed and lowered to support the chipper 10 when it is detached from the tow vehicle. The chipper 10 includes a large frame structure onto which all other components are mounted.

Figure 3:
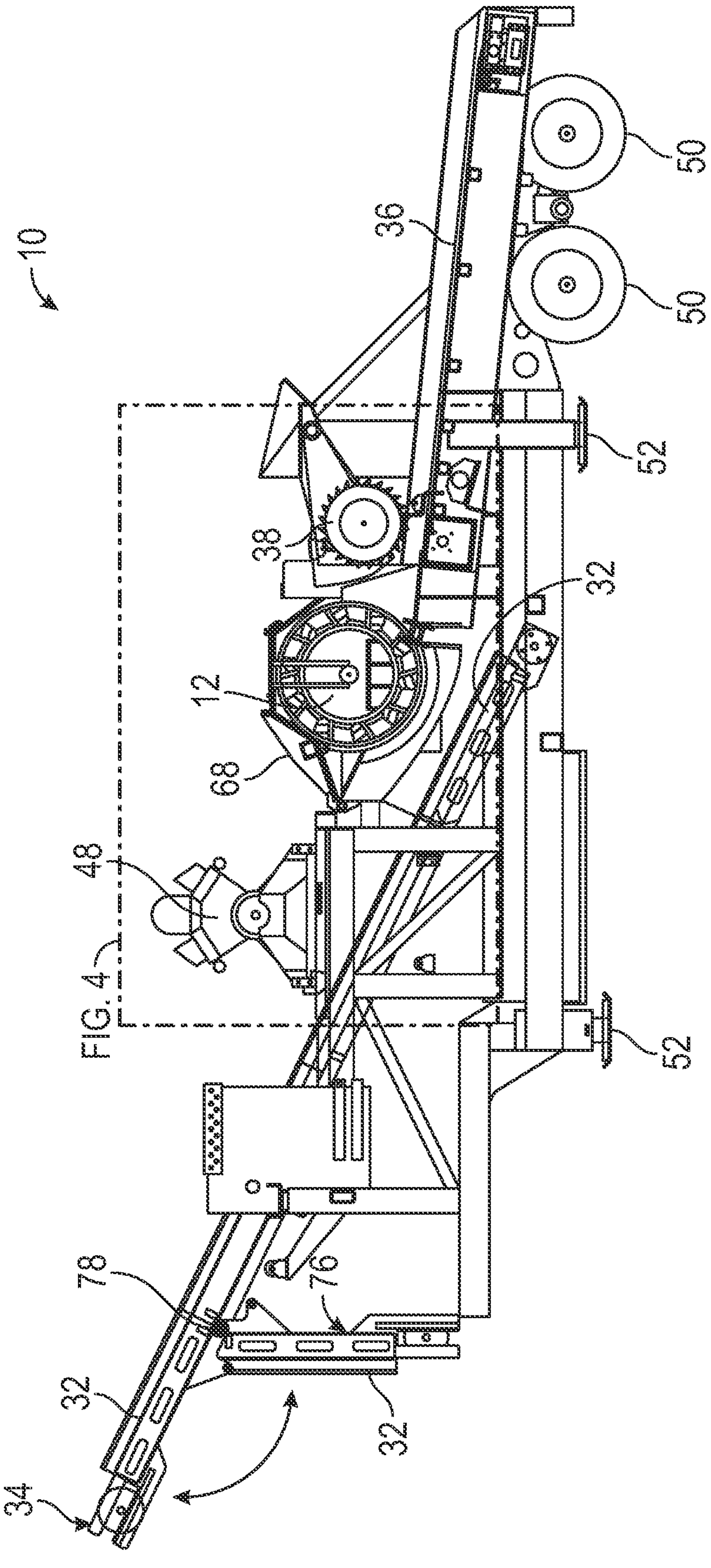
FIG. 3 shows a side schematic view of a wood chipper in accordance with the present disclosure.
Figure 4:
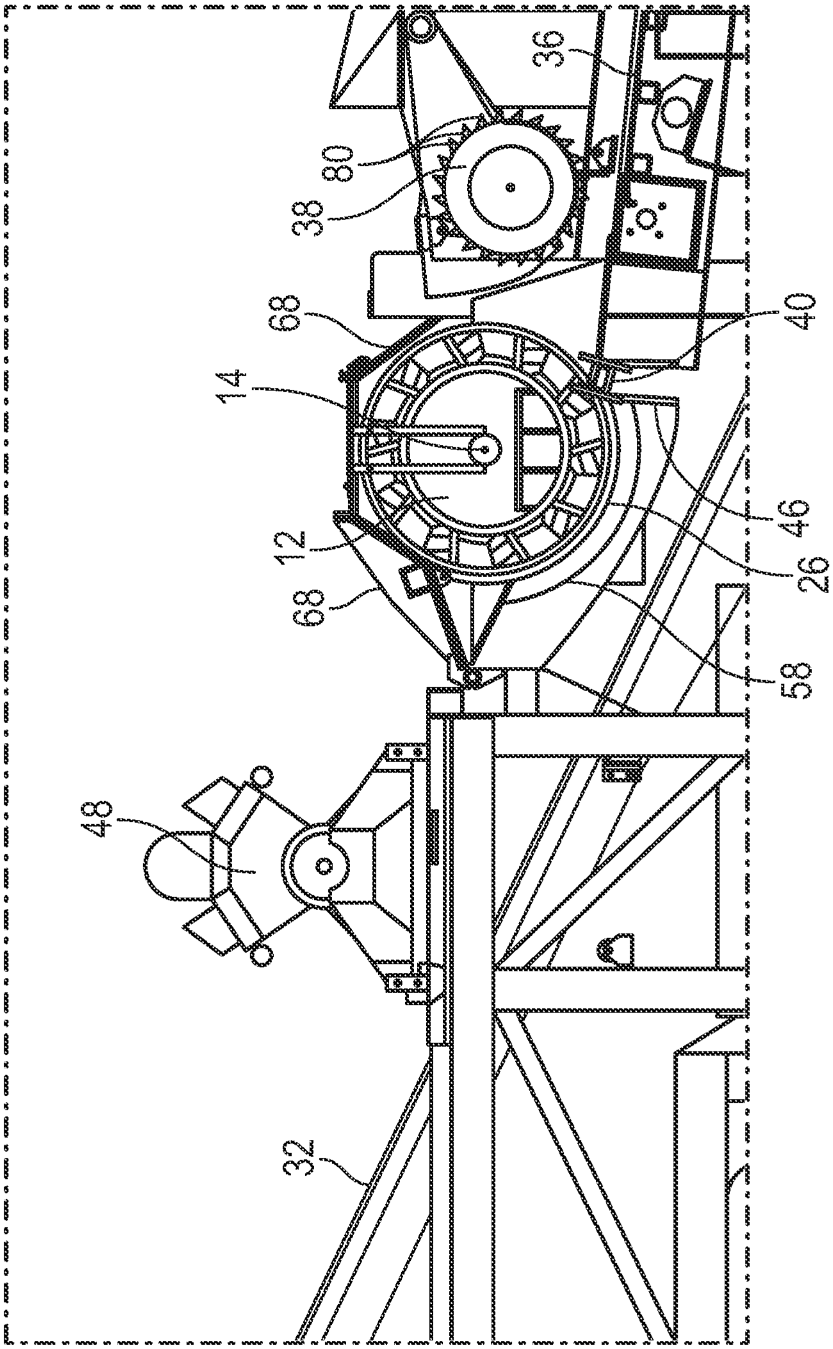
FIG. 4 shows a partial view of a wood chipper in accordance with the present disclosure.
Figure 7:
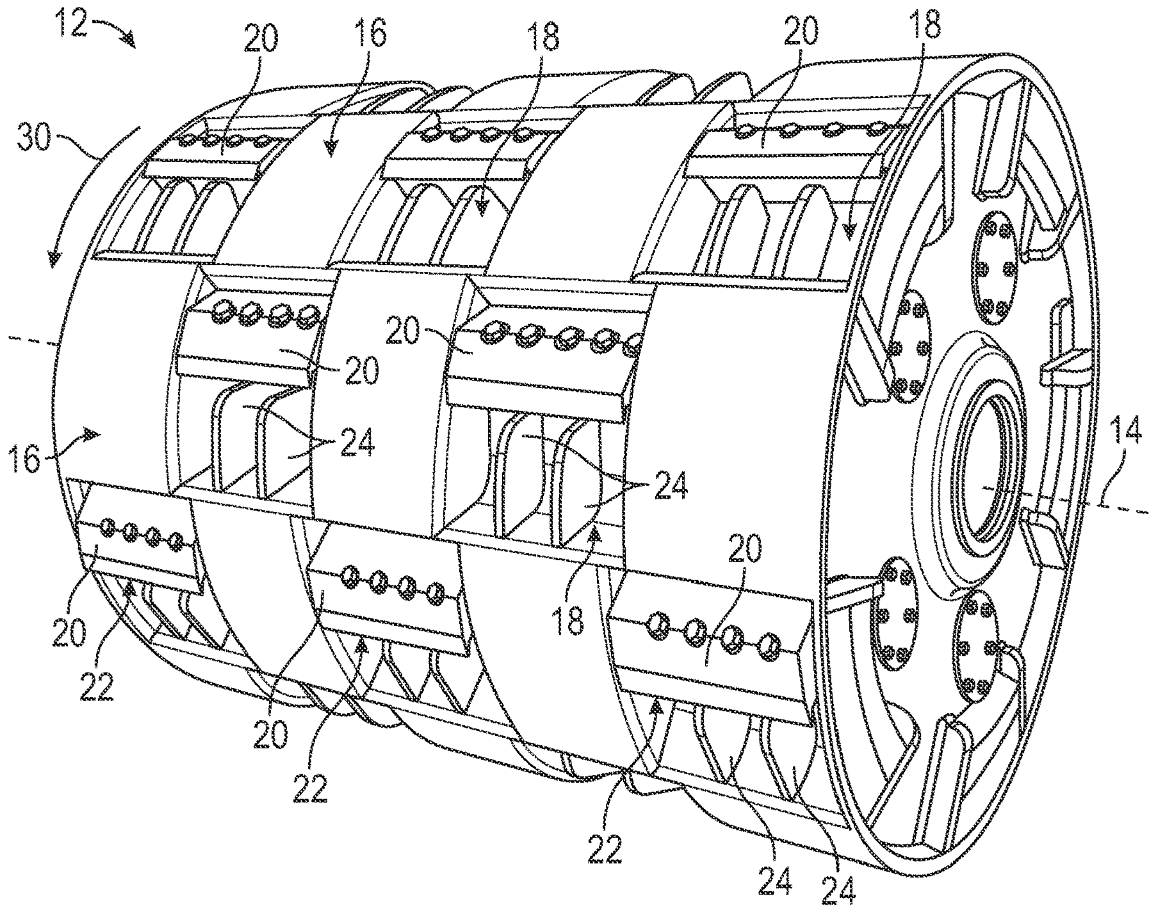
FIG. 7 shows a perspective view of a chipping drum of a wood chipper in accordance with the present disclosure.

The wood chipper 10 comprises a rotating chipping drum 12, a sizing screen 26, an infeed conveyor 36, and a discharge conveyor 32, as best seen in FIG. 3. The chipping drum 12 is mounted within a drum enclosure 68 that forms part of the frame or is mounted onto the frame of the chipper 10. The chipping drum enclosure 68 may be defined at least in part by end walls at opposing ends of the chipping drum 12, by the sizing screen 26, and/or by walls or other structures surrounding the drum 12 to contain wood chips 56 formed by the drum 12 and control discharge of wood chips 56 from the enclosure 68. The chipping drum enclosure 68 provides a generally enclosed chamber in which size reduction takes place. The chipping drum 12 rotates about an axis 14, as shown in FIG. 7. Rotation of the drum 12 is driven by a motor 48, which is preferably a diesel motor 48. FIGS. 1 and 2 show opposing sides of the chipper 10. As shown in FIG. 1, the drum 12 may be mounted onto the drum enclosure 68 on a bearing 70. As shown in FIG. 2, rotation of the drum 12 may be driven by a drive chain or belt, which may be protected by a protective cover 72. FIG. 3 shows a schematic view illustrating the position of all major components of the chipper 10 in relation to other components. FIG. 4 shows a close-up view of certain components shown in FIG. 3.

Figure 8:
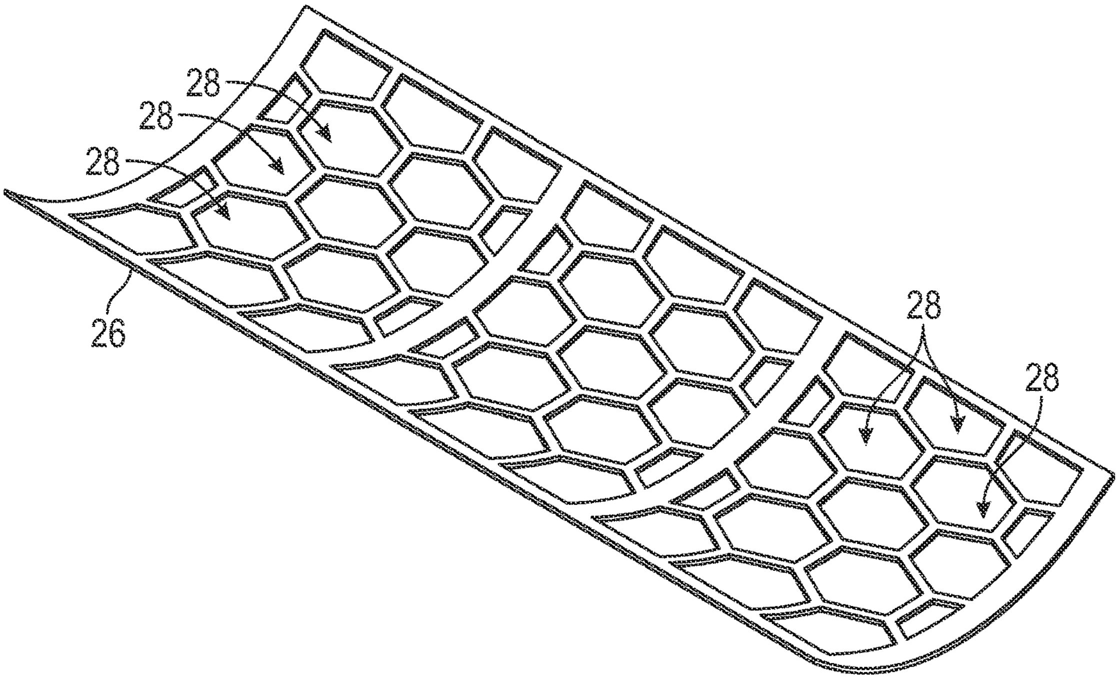
FIG. 8 shows a perspective view of a drum screen for a chipping drum of a wood chipper in accordance with the present disclosure.

As best seen in FIG. 7, the chipping drum 12 comprises a plurality of cutting blades 20 mounted on the drum 12. Each of the blades 20 has a leading edge 22 that is designed to cut logs 55, tree trunks, branches, limbs, or other woody material into wood chips 56. A sizing screen 26 at least partially surrounds the chipping drum 12 for sizing wood chips 56 that are reduced in size by the chipping drum 12 and discharged from the chipping drum enclosure 68 through the screen 26. The position of the sizing screen 26 in relation to the chipping drum 12 can be best seen in FIG. 4. The screen 26 may be retained in place by a screen holder 58. The sizing screen 26 has an arcuate shape designed to conform in shape to a curvature of the chipping drum 12. As shown in FIG. 8, the screen 26 has a plurality of apertures 28 extending through the screen 26. FIG. 8 illustrates a single panel of the screen 26, which may include multiple panels aligned with each other to form a continuously curved structure that fits adjacent to the drum 12. Each of the apertures 28 in the screen 26 is sized to limit the size of chips 56 that may pass through the screen 26 so that individual chips 56 do not exceed a maximum chip size corresponding to the size of each of the apertures 28. In a preferred embodiment, each aperture 28 may have a polygonal shape, which may preferably be a hexagonal shape, though the apertures 28 may alternatively have other shapes.

Figure 11:
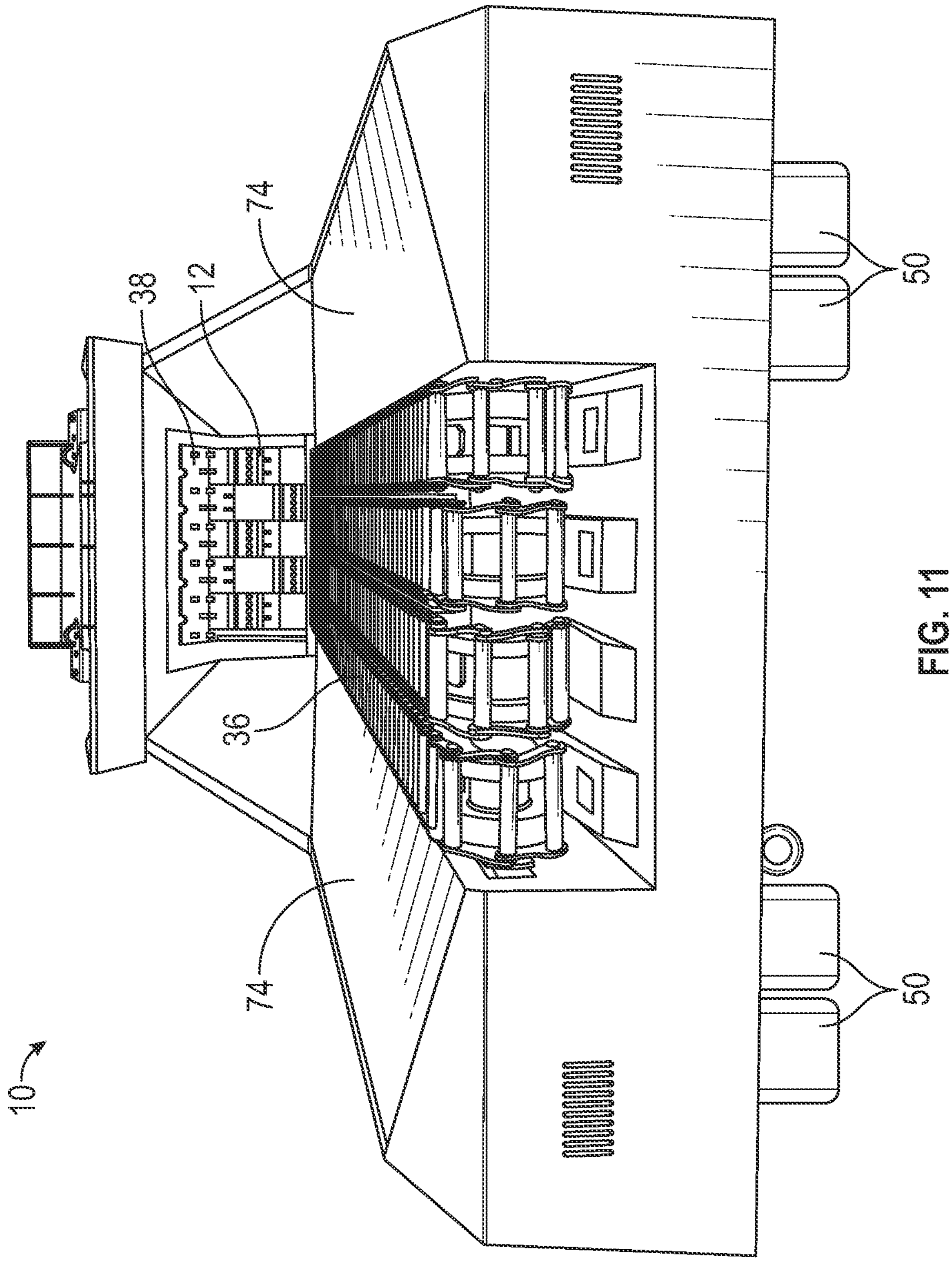
FIG. 11 shows a rear perspective view of a wood chipper in accordance with the present disclosure.

As best seen in FIG. 2, the infeed conveyor 36 is configured to continuously feed wood 55 to be comminuted to the chipping drum 12 for size reduction. FIG. 11 shows a rear view of the chipper 10 showing the infeed conveyor 36 and the feed entrance into the chipping drum enclosure 68 that houses the chipping drum 12. In a preferred embodiment, as shown in FIG. 11, the infeed conveyor 36 comprises an endless chain conveyor, which preferably includes a plurality of endless chains positioned adjacent to each other for conveying wood 55 toward the chipping drum 12. The frame structure of the chipper 10 preferably includes opposing sloped surfaces 74 on opposing sides of the infeed conveyor 36 to help direct wood 55 onto the conveyor 36 and minimize any wood 55 that may fall off of the chipper 10 when being loaded onto the infeed conveyor 36.

Figure 9:
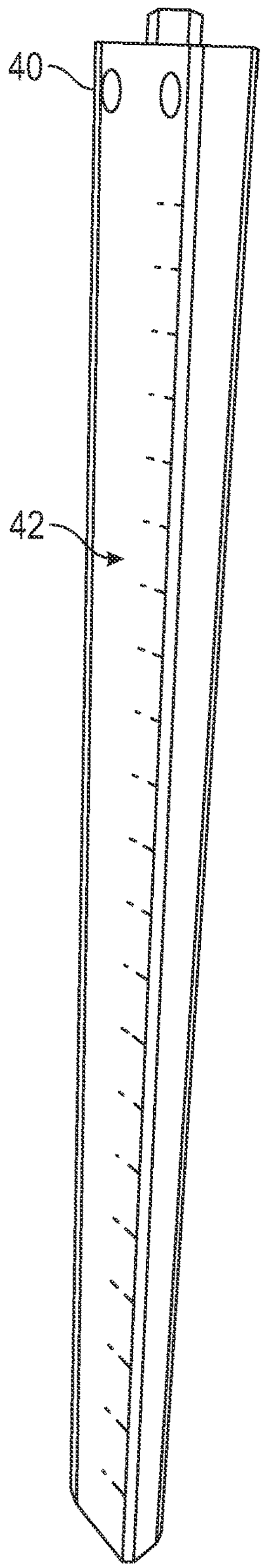
FIG. 9 shows a perspective view of an anvil of a wood chipper in accordance with the present disclosure.
Figure 10:
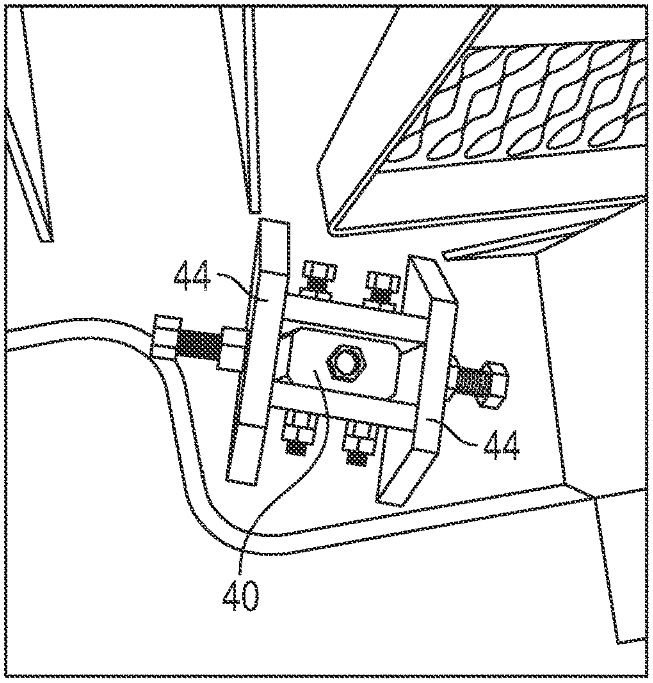
FIG. 10 shows a partial view of a wood chipper showing an anvil mounted on the wood chipper in accordance with the present disclosure.

In a preferred embodiment, the chipper 10 further comprises an anvil 40 positioned at an end of the infeed conveyor 36 that is adjacent to the chipping drum 12 at the entrance into the chipping drum enclosure 68. The anvil 40 has an elongated shape and may be mounted at each end of the anvil 40 onto the frame of the chipper 10. In one embodiment, the anvil 40 may be mounted onto the end walls of the drum enclosure 68, as shown in FIGS. 1 and 2. FIG. 9 shows the anvil 40 detached from the chipper 10. The anvil 40 has an upper surface 42, which is the striking surface, and preferably has beveled edges along each of the longitudinal edges of the anvil 40. FIG. 10 shows a close-up view of a mounting bracket 44, which may include bolts for securely fastening the anvil 40 in place. The mounting brackets 44 may be attached to the end walls of the drum enclosure 68 or to another suitable component of the frame of the chipper 10. When the drum 12 rotates in a rotational direction 30, the leading edge 22 of each of the blades 20 moves downward in a direction toward the upper surface 42 of the anvil 40 so that the blade edges 22 strike the wood 55 in a downward motion against the upper surface 42 of the anvil 40 as the leading edges 22 of the blades 20 pass adjacently to the anvil 40. The upper surface 42 of the anvil 40 is generally aligned with the infeed conveyor 36, and thus the leading edge 22 of each of the blades 20 moves downward in a direction also toward the infeed conveyor 36. From the perspective shown in FIGS. 3-5, the chipping drum 12 rotates in a clockwise rotational direction 30. The chipping drum 12 is not configured to rotate in the opposite rotational direction (i.e., with the leading edges of the blades moving in an upward direction away from the upper surface of the anvil as the edges pass adjacently to the anvil) during normal operation of the chipper 10.

In a preferred embodiment, as best seen in FIGS. 3 and 4, the chipper 10 further comprises a rotating infeed drum 38 configured to act in conjunction with the infeed conveyor 38 to draw wood 55 toward the chipping drum 12. The infeed drum 38 comprises a plurality of teeth 80 mounted onto or otherwise attached to an exterior of the infeed drum 38 and extending radially outward from the exterior of the infeed drum 38. The plurality of teeth 80 on the drum 38 engages with the wood material 55 to forcibly draw the wood 55 toward the chipping drum 12 as the infeed drum 38 rotates. The infeed drum 38 rotates in the same rotational direction as the chipping drum 12, which is a clockwise direction from the perspective shown in FIG. 4. The infeed conveyor 36 generally conveys the wood 55 in a direction toward both the infeed drum 38 and the chipping drum 12 when the wood 55 is loaded onto the infeed conveyor 36, and the infeed drum 38 ensures that the wood 55 is continuously forced into the drum enclosure 68 and into forcible contact with the blades 20 of the chipping drum 12. In a preferred embodiment, as best seen in FIG. 4, the teeth 80 of the infeed drum 38 are pointed in a forward-facing direction relative to the direction of rotation. Thus, each of the teeth 80 has a leading point that moves downward in a direction toward the infeed conveyor 36 on an upstream side of the drum 38 relative to a conveyance direction on the infeed conveyor 36. As the infeed drum 38 rotates, this configuration of teeth 80 allows the points of each of the teeth 80 to forcibly engage with the wood 55 and pull the wood 55 along the infeed conveyor 36 toward the chipping drum 12 as the leading points of the teeth 80 move directly above the infeed conveyor 36 back toward the chipping drum 12. The infeed drum 38 is positioned in relation to the infeed conveyor 36 so that there is a clearance between the teeth 80 of the infeed drum 38 and the infeed conveyor 36 that is suitable for the teeth 80 to engage with large pieces of wood such as logs 55 or tree trunks. The vertical positioning of the infeed drum 38 may optionally be adjustable for use with logs, trunks, or other woody material of various sizes.

The discharge conveyor 32 is configured to mechanically convey wood chips 56 from the chipping drum 12 to a discharge point 34 where the chips 56 are discharged from the chipper 10. The chips 56 may be discharged from the discharge point 34 into a discharge container 54. In one embodiment, as shown in FIG. 2, the discharge container 54 may be an open-top semi-trailer. The discharge conveyor 32 is a mechanical conveyor that is configured to physically carry the wood chips 56 to the discharge point 34. This allows the discharge conveyor 32 to discharge the chips 56 into an open container, such as an open-top trailer 54, or directly onto another conveyor. The discharge conveyor 32 does not include a blower or other mechanism for pneumatically conveying the chips. In a preferred embodiment, the discharge conveyor 32 comprises an endless belt conveyor that carries the wood chips 56 on an upper surface of a belt to the discharge point 34.

The discharge conveyor 32 is disposed in a position below the sizing screen 26. As best seen in FIG. 3, an upstream end of the discharge conveyor 32 opposite the discharge point 34 is disposed directly below the sizing screen 26 so that wood chips 56 that pass through the screen 26 fall downward and directly onto the discharge conveyor 32 to be conveyed to the discharge point 34. As best seen in FIG. 4, the chipper 10 preferably includes a baffle plate 46 that extends downwardly from the drum enclosure 68. The baffle plate 46 is preferably disposed in a generally vertical position and directly above the upstream end of the discharge conveyor 32. The baffle plate 46 is preferably also positioned at an upstream end of the sizing screen 26 and at a downstream end of the anvil 40 directly adjacent to the anvil 40. The baffle plate 46 helps to contain the wood chips 56 being discharged from the drum enclosure 68 and direct the wood chips 56 downward onto the discharge conveyor 32 to minimize any overflow losses of chips from the discharge conveyor 32.

As shown in FIG. 3, in a preferred embodiment, the discharge conveyor 32 includes an end section 76 that is configured to pivot about a hinge 78 so that the overall footprint of the chipper 10 can be minimized during transport or storage by pivoting the end section 76 downward, as indicated by the arrows illustrated in FIGS. 3 and 12.

Figure 5:
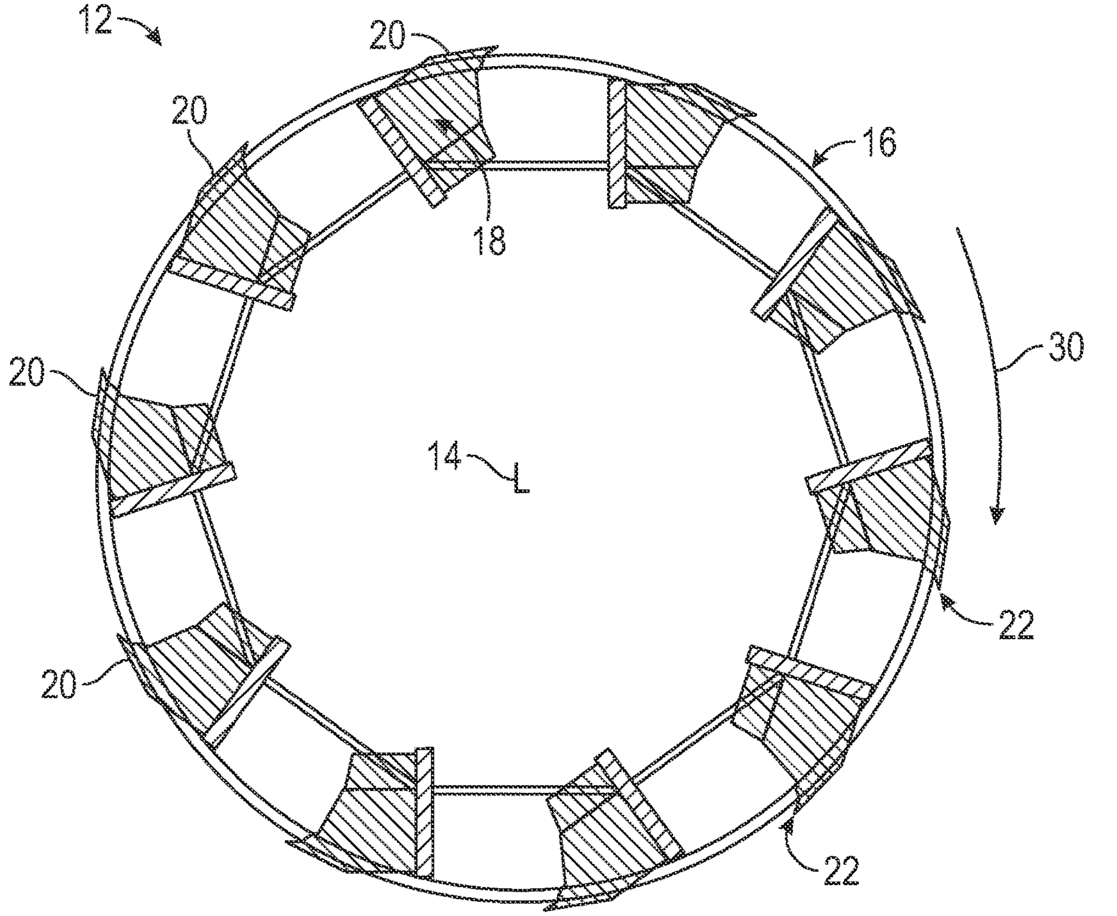
FIG. 5 shows a cross sectional view of a chipping drum of a wood chipper in accordance with the present disclosure.

As best seen in FIG. 7, the chipping drum 12 has a plurality of pockets 18, and each of the blades 20 is mounted on the chipping drum 12 in a position such that the leading edge 22 of each of the blades 20 is disposed over a respective one of the pockets 18. Each of the pockets 18 is a hollow area that is open on a radially exterior side of each pocket 18 relative to the drum 12 and below the leading edge 22 of the blade 20 that is mounted onto the pocket 18. Outside of the pockets 18, the chipping drum 12 preferably has a generally smooth exterior surface 16, as seen in FIG. 7. Each blade 20 may be attached to the drum 12 using bolts or similar types of fasteners that allow the blades 20 to be removed for maintenance, including cleaning and/or sharpening. In a preferred embodiment, as best seen in FIG. 5, at least a portion of each blade 22, including the leading edge 22 of each blade 20, is disposed in a position in which the blade 20 and edge 22 extends radially outward from the drum 12 to a point that is radially beyond the exterior surface 16 of the drum 12, which allows the leading edges 22 of the blades 20 to effectively strike the wood 55 being comminuted so that the wood continuously and forcibly contacts the upper surface 42 of the anvil 40 as the drum 12 rotates.

Figure 6:
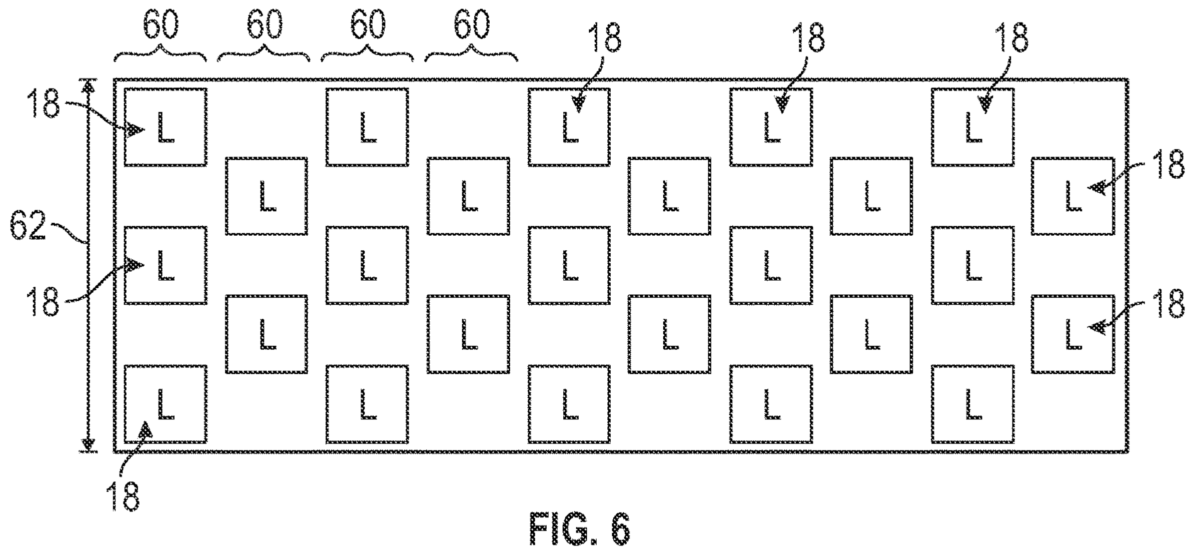
FIG. 6 shows a schematic view of a chipping drum of a wood chipper in accordance with the present disclosure.

In a preferred embodiment, the pockets 18 and the blades 20 are arranged in a configuration that consistently produces uniformly sized wood chips 56. FIG. 6 shows a schematic view of an exterior of the chipping drum 12 that is shown in a flattened state to illustrate the arrangement of pockets 18 on the drum 12. Each of the squares shown in FIG. 6 represent one pocket 18.

As seen in FIGS. 6 and 7, the pockets 18 and the blades 20 are arranged in a plurality of adjacent rows 60 of pockets 18. Each row 60 of pockets 18 includes multiple pockets 18 that are linearly aligned with each other along a linear direction 62 that is perpendicular to the rotational direction 30 of the chipping drum 12. The pockets 18 in each of the rows 60 of pockets 18 are disposed in a spaced relation to adjacent pockets 18 in the same row 60. The spaces between pockets 18 have a generally smooth exterior surface 16. The spaces between pockets 18 also preferably each have a diameter relative to direction 62 that is approximately equal to an internal diameter of each pocket 18 relative to direction 62. The pockets 18 in each row 60 of pockets are offset from the pockets 18 in each adjacent row 60 of pockets. Thus, the blades 20 in each row 60 are also offset from the blades 20 in each adjacent row 60. In a preferred embodiment, each of the pockets 18 and blades 20 in one row 60 are out of phase by 180 degrees from the pockets 18 and blades 20 in each adjacent row 60 on either side of the row 60 relative to the rotational direction 30 of the drum 12. Each blade 20 has a left end and a right end relative to direction 62. In the offset configuration of the blades 20 in adjacent rows 60, the left side of each blade 20 is aligned with the right side of a blade 20 in each adjacent row 60 along the rotational direction 30, and the right side of each blade 20 is aligned with the left side of a blade 20 in each adjacent row 60 along the rotational direction 30 (except for the blade ends that are directly adjacent to the ends of the drum 12). In a preferred embodiment, each row 60 of pockets 18 includes either two pockets 18 or three pockets 18, and adjacent rows 60 of pockets 18 alternate between having two pockets 18 and three pockets 18 per row 60, as best seen in FIG. 6.

As best seen in FIG. 7, the leading edge 22 of each of the blades 20 is a generally straight edge that is disposed in a directional position that is perpendicular to the rotational direction 30 of the chipping drum 12. Thus, the leading edge 22 of each blade 20 is generally parallel to direction 62, and each edge 22 of the blades 20 in each row 60 of blades 20 is also linearly aligned along direction 62 with all of the blade edges 22 of the blades 20 in the same row 60. In addition, the aligned edges 22 of the blades 20 in each row 60 are equidistant from the aligned edges 22 of the blades 20 in each adjacent row 60 of blades 20 relative to the rotational direction 30 of the drum 12. Further, the distance between the aligned edges 22 of the blades 20 in one row 60 is approximately the same as a diameter of each pocket 18 along the rotational direction 30 of the drum 12. Thus, in the present configuration, the blades 20 and pockets 18 are all arranged in a linear configuration relative to each other along a longitudinal length of the drum 12 parallel to axis 14, and neither the blades 20 nor pockets 18 are spaced or arranged in a helical configuration around the outside of the drum.

In a preferred embodiment, as shown in FIG. 7, each of the pockets has a pair of plates 24 disposed within the pocket 18. Each of the plates 24 is a generally flat planar element. Each of the plates 24 is disposed in a position that is perpendicular to the leading edge 22 of the blade 20 and parallel to the rotational direction 30 of the chipping drum 12. Each of the plates 24 is attached to an interior of the pocket 18 and extends radially outward from the interior of the pocket 18. An exterior edge of each plate 24 is positioned generally adjacent to an interior side of the blade 20 that is disposed over the pocket 18 in which the plate 24 is mounted so that the exterior edge of each plate 24 is in a radially interior position relative to the interior side of the blade 20. The exterior edge of each plate 24 is at a radially distal end of each plate 24. The exterior edge of each plate 24 may optionally be sharpened to help in cutting wood 55 that is fed to the chipping drum 12.

As the chipping drum 12 rotates and the wood 55 is forcibly fed into the drum enclosure 68 to contact the blades 20, the leading edges 22 of the blades 20 strike the wood 55 in a downward direction with an opposite upward force created by the anvil 40 so that the wood is reduced in size into chips 56. The chips 56 may then immediately fall down onto the sizing screen 26 and be discharged or enter into the interior of the pockets 18 directly adjacent to the leading edges 22 of the blades 20. As the drum 12 continues to rotate, some chips 56 may be carried within the pockets 18 in a full circle and recycled back to the anvil 40 to then be discharged through the screen 26 or further reduced in size. Further size reduction may also occur as chips 56 accumulate within the enclosure 68, in which case the blades 20 may forcibly contact wood chips against the screen 26 or against other structures or walls surrounding the drum 12, thereby reducing the size of larger chips within the enclosure 68. An equilibrium may be reached in which a certain amount of chips accumulate within the enclosure 68, and chips of an appropriate size are forcibly discharged through the apertures 28 in the screen 26. Applicant has found that the present configuration of the chipping drum 12, including the configuration and arrangement of pockets 18 and blades 20, in combination with the sizing screen 26, results in the production of more uniformly sized chips 56 compared to other wood chippers. In addition, the use of a mechanical discharge conveyor 32 rather than a blower generally eliminates many wear parts of the chipper 10, thereby reducing maintenance costs and allowing more available power to be utilized for chip 56 production rather than for conveyance. A mechanical discharge conveyor 32 also allows the chips 56 to be discharged into a standard open-top trailer 54, onto a mill feed conveyor when utilizing the chipper 10 in a pulp mill, or directly onto the ground.

A method of using the wood chipper 10 to produce uniformly sized wood chips 56 is also provided. The method comprises feeding wood 55 to the chipping drum 12 on the infeed conveyor 36. Rotation of the infeed drum 38 is initiated to forcibly draw the wood 55 into contact with the rotating blades 20 on the chipping drum 12. The motor 48 that drives rotation of the chipping drum 12 is initiated to rotate the drum 12 in a rotational direction 30 so that the leading edge 22 of each of the blades 20 moves in a downward direction toward the anvil 40, thereby causing the leading edge 22 of each blade 20 to forcibly strike the wood 55, which cuts the wood 55 into wood chips 56 of reduced size. As the blades 20 strike the wood 55, the wood 55 forcibly strikes against the upper surface 42 of the anvil 40, which produces an opposing force on the wood 55 and allows the blades 20 to effectively cut the wood 55 into chips 56 by applying a downward force on the wood 55 against the upper surface 42 of the anvil 40. The chipping drum 12 may be continuously rotated until the wood chips 56 are cut into sizes of a sufficiently small diameter to pass through the apertures 28 in the sizing screen 26 and fall downward onto the discharge conveyor 32. Chips 56 that are initially too large to pass through the screen 26 may be carried within the pockets 18 back around to the anvil 40 and recycled within the drum enclosure 68 as necessary until the chips 56 are resized to an appropriate size to pass through the apertures 28 of the screen 26. As the chips 56 pass through the screen 26, the discharge conveyor 32 may be initiated to mechanically convey the chips 56 to the discharge point 34 on a conveyor belt or other type of moving conveyor.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A wood chipper comprising:

a rotating chipping drum comprising a plurality of cutting blades mounted on the chipping drum;

a sizing screen at least partially surrounding the chipping drum, wherein the screen has a plurality of apertures extending through the screen;

an infeed conveyor configured to feed wood to the chipping drum, wherein the chipping drum rotates in a rotational direction such that a leading edge of each of the blades moves downward in a direction toward the infeed conveyor; and a discharge conveyor disposed below the screen, wherein the discharge conveyor is configured to mechanically convey wood chips from the chipping drum to a discharge point, wherein the leading edge of each of the blades is a generally straight edge disposed in a directional position that is perpendicular to the rotational direction of the chipping drum, wherein the chipping drum has a plurality of pockets, wherein each of the plurality of blades is mounted on the chipping drum in a position such that the leading edge of each of the blades is disposed over a respective one of the plurality of pockets, wherein the pockets are arranged in a plurality of adjacent rows of pockets, wherein each row of pockets includes a plurality of pockets that are linearly aligned with each other along a linear direction that is perpendicular to the rotational direction of the chipping drum, wherein the pockets in each of the rows of pockets are disposed in a spaced relation to adjacent pockets in a same row of pockets, wherein the pockets in each row of pockets are offset from the pockets in each adjacent row of pockets, wherein each of the pockets has a plate disposed within the pocket, wherein the plate is disposed in a position that is perpendicular to the leading edge of the blade that is disposed over the pocket and parallel to the rotational direction of the chipping drum, wherein the blades are arranged in a plurality of adjacent rows of blades, wherein the blades in each of the rows of blades are disposed in a spaced relation to adjacent blades in a same row of blades, wherein the blades in each row of blades are offset from the blades in each adjacent row of blades, and wherein the leading edge of each respective blade in adjacent rows of blades are arranged such that there is no gap along the rotational direction between the leading edge of each respective blade in a respective row of blades and the leading edge of a respective offset blade in the adjacent row of blades.

2. The wood chipper of claim 1, wherein the plate is attached to an interior of the pocket and extends radially outward from the interior of the pocket, wherein an exterior edge of the plate is positioned adjacent to an interior side of the blade that is disposed over the pocket.

3. The wood chipper of claim 1, wherein the sizing screen has an arcuate shape designed to conform to a curvature of the chipping drum.

4. The wood chipper of claim 1, further comprising an anvil positioned at an end of the infeed conveyor that is adjacent to the chipping drum, wherein the leading edge of each of the blades moves downward in a direction toward the anvil.

5. The wood chipper of claim 1, wherein the discharge conveyor comprises an endless belt conveyor.

6. A method of using a wood chipper, said method comprising the steps of:

providing a wood chipper, wherein the wood chipper comprises:

a rotating chipping drum comprising a plurality of cutting blades mounted on the chipping drum, a sizing screen at least partially surrounding the chipping drum, wherein the screen has a plurality of apertures extending through the screen, an infeed conveyor configured to feed wood to the chipping drum, wherein the chipping drum rotates in a rotational direction such that a leading edge of each of the blades moves downward in a direction toward the infeed conveyor, and a discharge conveyor disposed below the screen, wherein the discharge conveyor is configured to mechanically convey wood chips from the chipping drum to a discharge point, wherein the leading edge of each of the blades is a generally straight edge disposed in a directional position that is perpendicular to the rotational direction of the chipping drum, wherein the chipping drum has a plurality of pockets, wherein each of the plurality of blades is mounted on the chipping drum in a position such that the leading edge of each of the blades is disposed over a respective one of the plurality of pockets, wherein the pockets are arranged in a plurality of adjacent rows of pockets, wherein each row of pockets includes a plurality of pockets that are linearly aligned with each other along a linear direction that is perpendicular to the rotational direction of the chipping drum, wherein the pockets in each of the rows of pockets are disposed in a spaced relation to adjacent pockets in a same row of pockets, wherein the pockets in each row of pockets are offset from the pockets in each adjacent row of pockets, wherein each of the pockets has a plate disposed within the pocket, wherein the plate is disposed in a position that is perpendicular to the leading edge of the blade that is disposed over the pocket and parallel to the rotational direction of the chipping drum, wherein the blades are arranged in a plurality of adjacent rows of blades, wherein the blades in each of the rows of blades are disposed in a spaced relation to adjacent blades in a same row of blades, wherein the blades in each row of blades are offset from the blades in each adjacent row of blades, and wherein the leading edge of each respective blade in adjacent rows of blades are arranged such that there is no gap along the rotational direction between the leading edge of each respective blade in a respective row of blades and the leading edge of a respective offset blade in the adjacent row of blades;

feeding wood to the chipping drum on the infeed conveyor;

rotating the chipping drum in a rotational direction such that the leading edge of each of the blades moves downward in a direction toward the infeed conveyor, thereby causing the leading edge of each of the blades to cut the wood into wood chips;

continuously rotating the chipping drum until the wood chips are cut into sizes sufficiently small to pass through the apertures in the screen and fall downward onto the discharge conveyor; and using the discharge conveyor to mechanically convey the wood chips to the discharge point.

7. The method of claim 6, wherein the plate is attached to an interior of the pocket and extends radially outward from the interior of the pocket, wherein an exterior edge of the plate is positioned adjacent to an interior side of the blade that is disposed over the pocket.

8. The method of claim 6, wherein the screen has an arcuate shape designed to conform to a curvature of the chipping drum.

9. The method of claim 6, further comprising an anvil positioned at an end of the infeed conveyor that is adjacent to the chipping drum, wherein the leading edge of each of the blades moves downward in a direction toward the anvil, thereby causing the leading edge of each of the blades to cut the wood into wood chips by applying a downward force on the wood against an upper surface of the anvil.

10. The method of claim 6, wherein the discharge conveyor comprises an endless belt conveyor.

11. The wood chipper of claim 1, wherein the plate is disposed in a position that is downstream of the leading edge of the blade that is disposed over the pocket relative to the rotational direction of the chipping drum.

12. The wood chipper of claim 11, wherein each of the pockets has a plurality of plates disposed within the pocket, wherein each plate of the plurality of plates is disposed in a position that is perpendicular to the leading edge of the blade that is disposed over the pocket and parallel to the rotational direction of the chipping drum.

13. The wood chipper of claim 1, wherein the chipping drum has a generally smooth exterior surface extending continuously between each respective pocket of the plurality of pockets in each respective row of pockets.

14. The wood chipper of claim 1, wherein the chipping drum has at least three blades disposed along the rotational direction of the chipping drum at any point between two opposing ends of the chipping drum.

15. The wood chipper of claim 1, wherein the plurality of pockets in each of the rows of pockets are linearly aligned in an equidistantly spaced relation, and wherein the plurality of blades in each of the rows of blades are also linearly aligned in an equidistantly spaced relation.

* * * * *